Patented Jan. 18, 1938

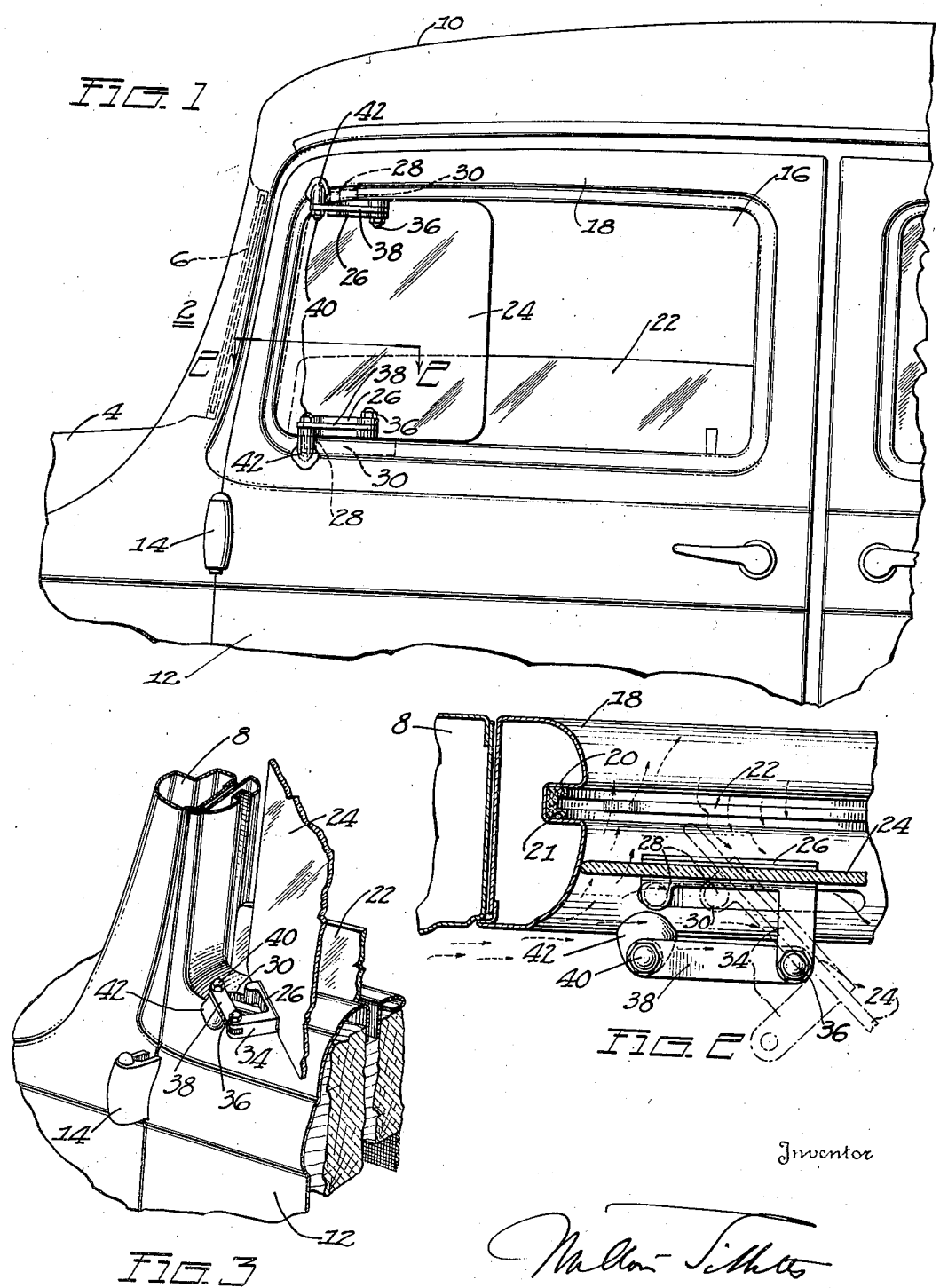

2,105,936

UNITED STATES PATENT OFFICE 2,105,936

MOTOR VEHICLE

Milton Tibbetts, Detroit, Mich., assignor to Packard Motor Car Company, Detroit, Mich., a corporation of Michigan Application October 20, 1934, Serial No. 749,151

12 Claims. (Cl. 296—84)

This invention relates to motor vehicles and more particularly to adjustable deflectors of the type applied to the sides of a motor vehicle adjacent the window openings to deflect air currents flowing along the sides of the vehicle during the forward movement thereof with relation to said openings.

One object of the present invention is to improve the construction and mode of operation of adjustable air deflectors of the type referred to above and to produce a deflector which has a novel movement in its adjustment into various angular positions.

Certain features of the invention relate to a deflector mounted so that it lies alongside a window or the plane thereof or alongside the closed position of a movable window. It is desirable that an air deflector of this character should be so supported and controlled that, when in inactive position it lies within the outer side faces of the window frame and close to the window or to the path of movement of the window and that it may be quickly and easily adjusted outside the window or the path thereof into various angular positions. It is also desirable that such a deflector, when in inactive position, should have its forward edge located close to the forward side portion of the window frame and that the deflector should be conveniently adjustable from this position into a position inclined outwardly with relation to the general plane of the window frame from the forward toward the rear edge of the deflector and to form an opening of substantial width between the forward edge thereof and the window frame for the flow of air. Another object of the invention is to produce a deflector construction in which these advantageous results are secured.

Certain features of the invention relate to deflectors mounted by the side of a vertically slidable window arranged to close the entire window opening or by the side of the path of such a window. A further more specific object of the invention is to produce, in combination with such a window, a deflector constructed and arranged to secure the above advantages which is adjustable through a wide angular range with the window in partially raised position.

Another object of the invention is to produce an adjustable air deflector for motor vehicles in which the mechanism for supporting and controlling the deflector is constructed and arranged to cause the deflector to execute a combined bodily shifting and swinging movement when the deflector is adjusted into different angular positions.

This invention will be clearly understood from the accompanying drawing illustrating the invention in its preferred form and the following detailed description of the constructions therein shown.

In the drawing, Fig. 1 is a view in side elevation illustrating a portion of a motor vehicle of the closed type having an air deflector embodying the invention applied thereto;

Fig. 2 is a detail sectional view taken substantially on the line 2—2 of Fig. 1, and Fig. 3 is a detail perspective view illustrating certain portions of the motor vehicle with the deflector in inclined air deflecting position.

The invention is illustrated in the drawing of this application as applied to a motor vehicle of the closed type indicated as a whole at 2 which comprises a cowl 4, a windshield 6, supports or pillars 8, respectively located at each side of the windshield, and a roof 10. The vehicle is provided with a front door 12, mounted upon hinges, one of which is indicated at 14. The door is constructed with a window opening 16, surrounded by a window frame 18. The door frame is formed with channels 20, within which are secured guides 21 and a window 22 is mounted to slide vertically in said guides, the window being arranged to close the entire window opening when in its upper position.

In the illustrated form of the invention an air deflector 24 is mounted at the forward portion of the window opening so that it lies alongside the window when the window is partially or fully raised, is movably supported between the upper and lower sides of said frame and when in inactive position lies within the outer side faces of the window frame and preferably close to the window 22.

The deflector is shown in full lines in Fig. 2 in an inactive position substantially parallel with the general plane of the window frame and with the window 22. When in this position the forward edge of the deflector is preferably substantially in contact with the forward side portion of the window frame so that no air can enter between the frame and the deflector at this point. The deflector is adjustable from the inactive position shown in full lines in Fig. 2 into various angular air deflecting positions. The deflector is shown in dot-and-dash lines in Fig. 2 when adjusted into a position outside the path of the window inclined outwardly from the plane of the window frame from its forward toward its rear edge and having an opening of substantial width between the forward edge of the deflector and the forward side of said frame for the flow of air. The mechanism for supporting and controlling the deflector is constructed and arranged to cause the same, in its adjustment from one angular position to another, to execute a combined bodily shifting and swinging or pivotal movement. The mechanism for supporting the deflector and controlling the movement thereof comprises brackets 26 secured respectively to the top and bottom margins of the deflector and each carrying a pivot pin 28 engaging in a slot 30 in the window frame extending in the direction of and preferably substantially parallel with the plane of the window. The pivot pins 28 are preferably in alignment and have a common axis extending in a vertical direction. Each of the brackets 26 is provided with an arm 34 extending outwardly from the deflector to which is pivoted by means of a stud 36 one end of a link 38. The other end of each link is pivoted by means of a stud 40 to a bracket 42 secured to the window frame.

The pivot pins 28 are located at distances from the forward edge of the deflector less than the distances between the slots 30 and the window 22. The forward margin of the deflector therefore will not engage the window when the window is raised above the lower part of the window frame in any angular adjustment of the deflector and the deflector may then be adjusted through a wide angular range. In the illustrated construction the deflector may be adjusted through an angular range of 90 degrees or more.

With the above construction the deflector will have the following mode of operation. When the deflector is in the inactive position shown in full lines in Fig. 2 and the window is partially or fully opened, the air currents rushing past pillar 8 and the forward portion of the window frame, after passing the deflector, may enter the vehicle through the window opening at the rear of the deflector. When it is desired to ventilate the vehicle without the production of drafts, the deflector is adjusted in an angular position with relation to the window 24 such as that shown in dot-and-dash lines in Fig. 2. The deflector is moved from the position shown in full lines in Fig. 2 to the position shown in dot-and-dash lines in said figures preferably by grasping the rear portion of the deflector and moving the same outwardly. During this adjustment of the deflector the pins 28 shift rearwardly along the slots 30 and the deflector pivots about said pins, its movement being controlled by the links 38. Thus the deflector executes a combined bodily shifting movement substantially parallel with the window and a pivotal movement about a vertical axis. By the combined bodily shifting and swinging movement of the deflector the forward margin thereof is carried rearwardly away from the adjacent margin of the window frame to form an opening of substantial width for the passage of air currents.

The deflector, of course, may be adjusted in various positions intermediate between the position parallel with the window shown in full lines in Fig. 2 and the inclined position shown in dot-and-dash lines in said figure and into positions having a still greater inclination to the plane of the window frame to vary the width of the opening between the forward margin thereof and the window frame and to vary the deflecting action of the deflector on the air currents rushing past the side of the vehicle and thereby vary the air circulation within the vehicle.

With the deflector in an inclined position such as that shown in dot-and-dash lines in Fig. 2, part of the air currents passing the support 8 and the forward portion of the window frame, during the forward movement of the car, will engage the deflector and will be deflected outwardly away from the vehicle as indicated by the arrows 32. These air currents passing the outer margin of the deflector will induce, by ejector action, air currents from within the vehicle on the rear side of the deflector. The opening between the forward margin of the deflector and the window frame will allow the entrance of air currents into the vehicle to take the place of the air withdrawn by ejector action. This circulation of air produces an efficient ventilation in the vehicle without the production of drafts.

In the construction shown and described in this application the deflectors, when in inactive positions, do not project beyond the side lines of the body of the vehicle and therefore do not interfere with the free flow of air along the sides of the vehicle. Furthermore, the deflectors, when adjusted in these positions, do not produce an unsightly break in the side lines of the vehicle but blend smoothly into said lines and enhance rather than detract from its attractive appearance.

It is to be understood that the invention is not limited to the particular construction and arrangement of parts of the illustrated embodiment of the invention but that the invention may be embodied in other forms within the scope of the claims.

Having explained the nature and object of the invention and having specifically described a construction embodying the invention in its preferred form what is claimed is:

1. A construction for motor vehicles comprising a structure having a window opening therein, a deflector panel, pivotal means for supporting said deflector panel in said window opening for swinging movement about an axis extending in a generally vertical direction, said pivotal means being shiftably mounted on said structure and means associated with said deflector panel and said structure for directing a bodily shifting of the deflector panel pivotal means in a rearwardly direction as the rear portion of said deflector is swung outwardly.

2. In a motor vehicle, the combination with the body having a side window opening and a window in said opening, of a deflector panel, and means for mounting and guiding said deflector panel comprising a guide, a pivot on the panel slidable in said guide, and a link pivotally connected to the panel and to said body at points remote from said pivot.

3. In a motor vehicle, the combination with the body having a window opening and a vertically sliding window for closing the entire opening, of a deflector panel, means for movably supporting said panel parallel to the window within the body opening in its closed position and with the front edge of said panel substantially against the front portion of the window frame, and means engaging said panel for directing movement of said panel angularly and rearwardly entirely clear of the plane of said window and to an angular position wherein the front edge of said panel leaves an appreciable opening between it and the front portion of the window frame for the passage of air therethrough when said window is opened.

4. In a motor vehicle, the combination with a body having a window opening and a vertically sliding window for closing said opening, of a deflector panel, movable means engaging said body and pivotally supporting said panel relative to said window in a plurality of positions between two extreme positions, one of said extreme positions being close to and in parallel with the window wherein the front edge of the panel is proximate the front portion of the frame of the window opening, the other of said two extreme positions being at a considerable angle to the plane of the window wherein the said front edge of said panel is located rearwardly of its former position whereby an appreciable opening is provided between said edge and said front portion of the window frame for the passage of air therethrough, and means associated with said first means and operatively engaging said panel for determining the path of movement of said panel between said two extreme positions and withholding all the parts of the panel from the path of said vertically sliding window throughout the entire range of movement of said panel.

5. In a motor vehicle, the combination with the body having a window opening and a window in said opening, of a deflector panel structure, shiftable means shiftably mounted on said body for supporting said panel structure in a plurality of positions, one of said positions being close to and in parallel with the window wherein the front edge of the panel is substantially against the front portion of the window opening, another of said positions being at considerable angle to the plane of the window and with said front edge rearwardly of its former position whereby an appreciable opening is provided between said edge and the front portion of the window frame for the passage of air therethrough, and means associated with said first means and pivotally engaging said panel structure for positively controlling the movement of said panel structure from one to the other of said positions in a predetermined relation to the plane of said window.

6. In a motor vehicle, the combination with the body having a frame defining a window opening, of a deflector panel, means for mounting and guiding said deflector panel including a guide and a pivot on the panel slidable in said guide, and means associated with said first means and pivotally engaging said panel and operatively engaging said frame for directing movement of said panel whereby said panel travels a predetermined curvilinear path.

7. In combination with a motor vehicle body having a frame defining a window opening, a ventilating member, shiftable pivot means engaging said frame for supporting said member in said opening, guide means for directing movement of said pivot means along a predetermined path, and means associated with said frame and said pivot means for rotating said ventilating member whenever said pivot means is moved along said path.

8. In combination with the body of a motor vehicle having a frame defining a window opening, a ventilating member, means slidably engaging said frame for pivotally supporting said member in said opening, and means pivotally engaging said frame and said member for rotating said member about said axis when said first means is slidably moved relative to said frame.

9. In combination with the body of a motor vehicle having a frame defining a window opening, a ventilating member, means slidably engaging said frame for pivotally supporting said member in said opening including an arm, and means pivotally engaging said frame and said arm for rotating said member in one direction when said first means is moved rearwardly in said opening.

10. In combination with the body of a motor vehicle having a frame defining a window opening and a vertically slidable window for closing said opening, of a ventilating member, means slidably associated with said frame outside of said window and pivotally supporting said member for rotation about a predetermined axis and means for moving said movable member rearwardly when said member is rotated about said axis with the rear edge thereof moving away from the plane of said window.

11. A ventilating device for an automobile comprising a deflector panel, pivot means shiftably connected to said automobile for supporting said panel, and means pivotally engaging said automobile at a fixed point and operatively engaging said panel at a point removed from said pivot means connection whereby said panel is rotated when said first means is moved relative to said automobile.

12. A construction for motor vehicles comprising a structure having a window opening therein, a deflector panel, pivot means shiftably connected to the structure for supporting said panel in the window opening for a swinging movement about an axis extending in a generally vertical direction, and means associated with said pivot means and operatively engaging said panel and said structure for moving said pivot means in a rearward direction as the rear portion of said deflector panel is swung outwardly.

MILTON TIBBETTS.